United States Patent [19]

Tsuchiya

[11] Patent Number: 4,958,231
[45] Date of Patent: Sep. 18, 1990

[54] ELECTRO-OPTICAL STREAK CAMERA

[75] Inventor: Yutaka Tsuchiya, Shizuoka, Japan

[73] Assignee: Hamamatsu Photonics Kabushiki Kaisha, Shizuoka, Japan

[21] Appl. No.: 351,159

[22] Filed: May 12, 1989

[30] Foreign Application Priority Data

May 13, 1988 [JP] Japan .................................. 63-116734

[51] Int. Cl.⁵ .............................................. H04N 5/30
[52] U.S. Cl. .............................. 358/211; 250/213 VT; 358/217
[58] Field of Search ............... 358/211, 217, 209, 218, 358/-229; 250/213 VT

[56] References Cited

U.S. PATENT DOCUMENTS

| | | | |
|---|---|---|---|
| 3,974,331 | 8/1976 | Pepin | 358/211 |
| 4,071,752 | 1/1978 | Manning | 358/211 |
| 4,266,247 | 5/1981 | Sutphin et al. | 358/217 |
| 4,327,285 | 4/1982 | Bradley | 250/213 VT |
| 4,581,648 | 4/1986 | Ganther | 358/211 |
| 4,611,920 | 9/1986 | Tsuchiya | 358/211 |
| 4,718,761 | 1/1988 | Tsuchiya | 356/318 |
| 4,802,002 | 1/1989 | Plut et al. | 358/211 |

FOREIGN PATENT DOCUMENTS 57-180055 11/1982 Japan .
62-142235 6/1987 Japan .

*Primary Examiner*—Stephen Brinich
*Attorney, Agent, or Firm*—Finnegan, Henderson, Farabow, Garrett, and Dunner

[57] ABSTRACT

An electro-optical streak camera including an amplifier for amplifying a light signal under measurement. The amplified light signal is applied to an electro-optical deflector of a photodector portion of the streak camera.

22 Claims, 8 Drawing Sheets

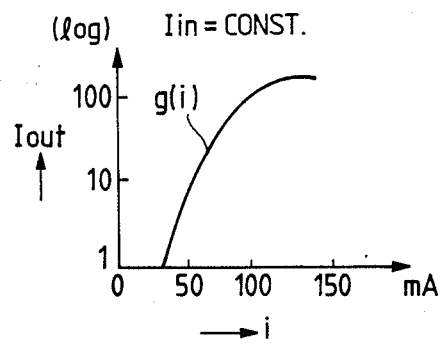
FIG. 4
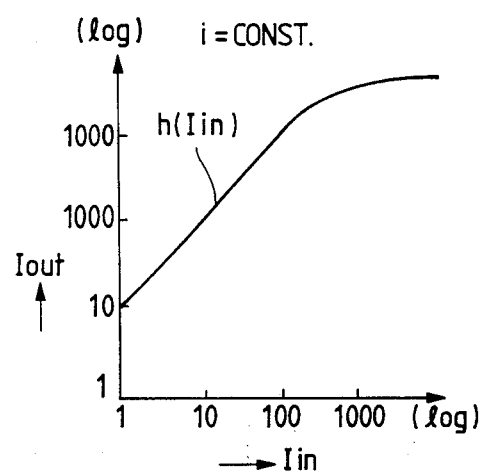
FIG. 5
FIG. 11
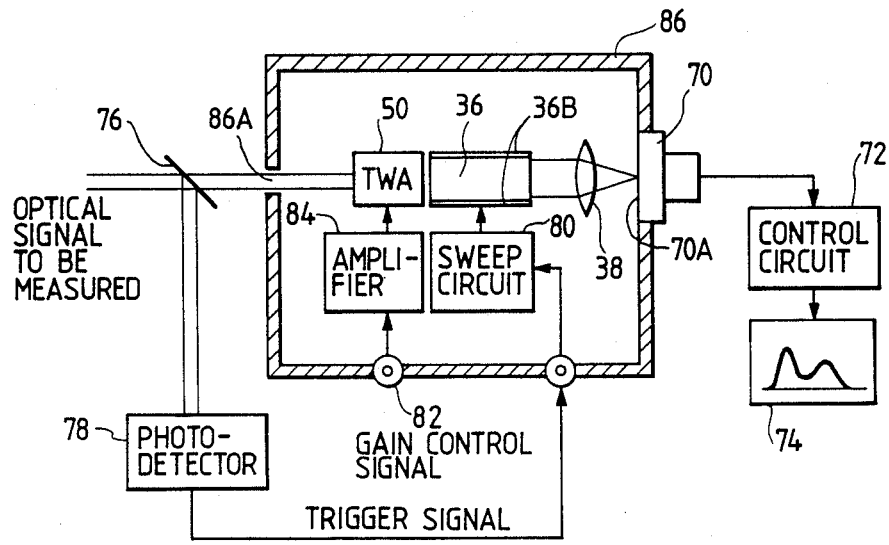

ELECTRO-OPTICAL STREAK CAMERA

FIELD OF THE INVENTION

This invention relates to electro-optic streak cameras and, more particularly, to a high-sensitivity electro-optic streak camera with an electro-optic deflector having an electro-optic crystal.

BACKGROUND OF THE INVENTION

There are available a variety of means for measuring the transient behaviors of ultra-high speed optical phenomena. One of the measuring means employs a streak camera in which an incident light signal is converted into an electron beam that is allowed to sweep at high speed, so that the intensity of an incident light signal that changes with time is measured as a variation in luminance with respect to position on the phosphor screen.

As shown in FIG. 17, an essential component of the streak camera, namely, a streak tube 13 comprises a photocathode 14 for converting into an electron image the light (slit image) which is applied through a slit plate 10 and image formed by a lens 12 of an input optical system; a mesh type accelerating electrode 16 for accelerating the electron image provided by the photocathode 14; deflecting electrodes 22 for deflecting, at high speed, the electron beam accelerated by the accelerating electrode 16 in a direction (which is a vertical direction in FIG. 17) perpendicular to the longitudinal direction of the slit; and a phosphor screen 26 for converting the electron image deflected by the deflecting electrodes 22 into an optical image (i.e.; a streak image that is a luminance data image in which the vertical axis represents the lapse of time).

Further in FIG. 17, a focusing electrode 18 is provided for focusing, to a certain degree, the electron beam accelerated by the accelerating electrode 16. An aperture electrode (or anode) 20 is provided for further accelerating the electron beam. A sweep circuit 23 is provided for applying a predetermined sweep voltage across the deflecting electrodes 22 in synchronism with the passage of the electron beam A micro channel plate (MCP) 24 is provided in front of the phosphor screen 26 to multiply the number of electrons passed through the deflecting electrodes 22. A conical shield electrode 25 is provided on the input side of the MCP 24 for blocking the electrons deflected out of the effective sweep region of the phosphor screen to improve the accuracy of measurement. Additionally, an image pickup device 28 comprising a high sensitivity television camera such as an SIT camera or CCD camera is provided for recording the streak image through a lens 27 of an output optical system.

Generally, the above-described streak camera is classified in a single sweep type streak camera and synchroscan type streak camera depending on the operating principle employed; i.e., the sweep system employed. In the single sweep type streak camera, a linear sweep is carried out by using an ultra-high speed saw tooth wave up to several kilohertz (KHz) in synchronism with a pulse laser beam. In the synchro-scan type streak camera, a high-speed repetitive sweep is carried out with a sine wave of 80 to 160 MHz in synchronism with a laser beam. In addition to the above-described two types of streak cameras, a synchronous blanking type streak camera has been developed in which an elliptical sweep is carried out. That is, as shown in FIG. 18, the return sweep is shifted sidewards so that the electron beam does not go across the phosphor screen 26.

The above-described method using the streak camera is a pure-electronic direct method having excellent time resolution and detection sensitivity. The method can measure single shot (non-repetitive) phenomena. In addition, for a streak image that is originally two-dimensional, the method can be used for time-resolved spectroscopic measurement or space-and-time-resolved measurement. Further, with the materials of the photocathode and the incident window appropriately selected, the method can perform measurement over a wide range of spectral sensitivity, e.g., ranging over near infrared, vacuum ultraviolet, and X-ray regions.

In addition, a sampling type optical oscilloscope has been put in practical use which, as shown in FIG. 19, has a sampling streak tube 30 in which a slit board 32 is provided for spatially limiting the streak image in the streak camera to electrically sample the streak image In FIG. 19, reference numeral 34 designates a photodetector for detecting the intensity of light which is emitted by phosphor screen 26 when an electron beam impinges on the latter. The photodetector may be a photomultiplier tube, high sensitivity photodiode, avalanche photodiode, or PIN photodiode.

The above-described streak cameras employ the streak tubes 13 and 30. Therefore, the utility of light is limited to 10 to 20% of maximum depending on the conversion efficiency of the photocathode 14.

On the other hand, an electro-optical deflector 36, as shown in FIG. 20, has recently been developed which deflects a light beam by using the fact that, by the electro-optic effect, the refractive index of a crystal of LiTaO$_3$, BaTiO$_3$, KTN or AMO can be changed In FIG. 20, deflector 36 comprises an electro-electro optic crystal 36A and electrodes 36B. The deflector does not employ a photocathode and a light beam applied to the electro-optic crystal 36A is deflected as it is, so that an improvement of the light utility factor can be realized.

The electro-optical deflector 36 utilizes the refractive index change ($\Delta n$) caused by the electro-optic effect. The refractive index change ($\Delta n$) is usually proportional to the internal electric field. The electric field changes spatially linearly within the crystal 36A, and therefore the incident light beam is deflected to form a phase difference spatially. The deflector described above can withstand high voltage, and can be manufactured readily. Further, it can provide a deflection angle about two times that provided by a compound prism type deflector when the two deflectors are configured the same and are operated with the same voltage.

A so-called "electro-optical streak camera" has been developed which, as shown in FIG. 21, employs the above-described electro-optical deflector 36 to directly deflect a light beam under measurement. When, in the electro-optical streak camera, the incident light beam is deflected, in a sweep mode, with the electro-optical deflector 36 and an output lens 38, the image whose vertical axis represents the lapse of time is obtained on the Fourier transform plane of the lens 38. As a result, the variation with time of a light signal can be measured by spatial analysis.

In the electro-optical streak camera, the electro-optical deflector 36 operates at an extremely high speed on the order of picoseconds. Therefore, the streak camera can have a relatively simple construction. In addition, the electro-optical streak camera is substantially unaffected by vibration or electro-magnetic field noise However, the conventional electro-optical streak camera is still disadvantageous in that, since it includes no function of amplifying the intensity of a light beam under measurement, it is low in sensitivity and therefore can not measure low-light phenomena. It is, therefore, difficult to put the electro-optical streak camera into practical use.

In order to eliminate the above described difficulty, the following solution has been proposed: The incident light beam, which heretofore was only allowed to pass through the central portion of the electro-optical crystal 36A, is passed substantially through the entire cross-sectional area of the electro-optical crystal 36A. That is, all of the light passed through the crystal 36A is utilized, so that the sensitivity is improved with the increased area. However, this solution is not sufficient to eliminate the above-described difficulty.

Further, no suitable detecting method has been proposed for the detection of streak images and, accordingly, it has been difficult to detect streak images with high sensitivity and with high S/N ratio.

SUMMARY OF THE INVENTION

Accordingly, an object of this invention is to eliminate the above-described difficulties accompanying a conventional electro-optical streak camera. More specifically, an object of the invention is to provide an electro-optical streak camera that is practical and can measure optical waveforms with high sensitivity Additional objects and advantages of the invention will be set forth in part in the description which follows, and in part will be obvious from the description, or may be learned by practice of the invention. The objects and advantages of the invention may be realized and attained by means of the elements and combinations particularly pointed out in the appended claims.

To achieve the objects and in accordance with the present invention, as embodied and described herein, there is provided an electro-optical streak camera for measuring a light signal. The streak camera comprises: an optical amplifier for amplifying the light signal under measurement to provide an amplified light signal; an electro-optical deflector for deflecting the amplified light signal; and means for detecting the deflected light signal.

The accompanying drawings which are incorporated in and constitute a part of this specification, illustrate embodiments of the invention and, together with the description, serve to explain the principles of the invention.

BRIEF DESCRIPTION OF THE DRAWINGS

FIGS. 4 and 5, are graphical representations showing examples of the output light intensity characteristic of the TWA;

FIG. 11 is a block diagram showing a first embodiment of the electro-optical streak camera according to the invention;

DESCRIPTION OF THE PREFERRED EMBODIMENT

Figure 1:
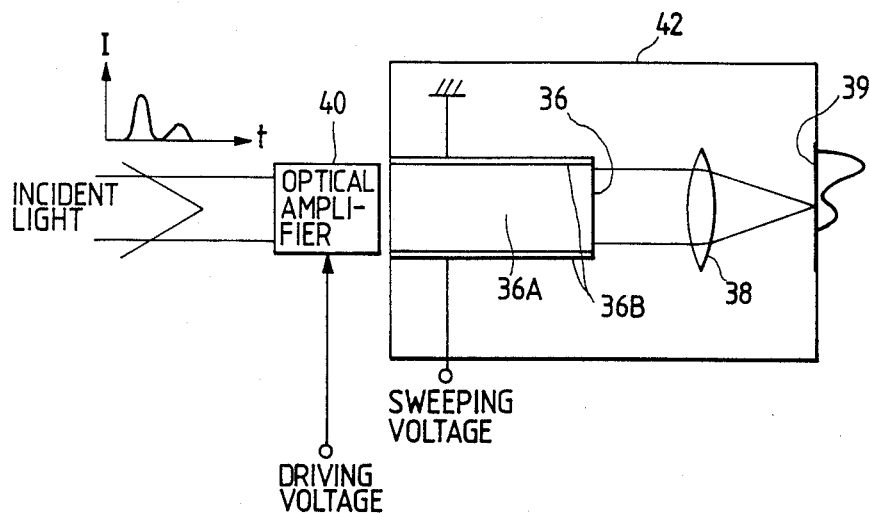
FIG. 1 is a block diagram showing the fundamental arrangement of an electro-optical streak camera according to the present invention.

FIG. 1 is an explanatory diagram indicating the fundamental structure of an electro-optical streak camera according to the invention. The streak camera includes an optical amplifier 40 for amplifying a light beam under measurement, the light beam amplified by the amplifier 40 being applied to an electro-optical deflector 36 in a photodetector 42. Deflector 36 includes an electro-optical crystal 36A and electrodes 36B for applying a sweep voltage across the electro-optical deflector 36. The streak camera further includes an output lens 38 and an focusing plane (or output screen) 39.

As was described above, the light beam is amplified by the optical amplifier before being applied to the electro-optical deflector 36, whereby the low detecting sensitivity accompanying a conventional electro-optical streak camera is eliminated. That is, the sensitivity is improved and the streak camera is highly practical. In the case where the gain of the optical amplifier 40 can be controlled, incident light beams over a wide range of intensity can be measured By controlling the gain of the optical amplifier 40, an optical gate is provided and high precision measurement can be carried out with a high S/N ratio.

Figure 17:
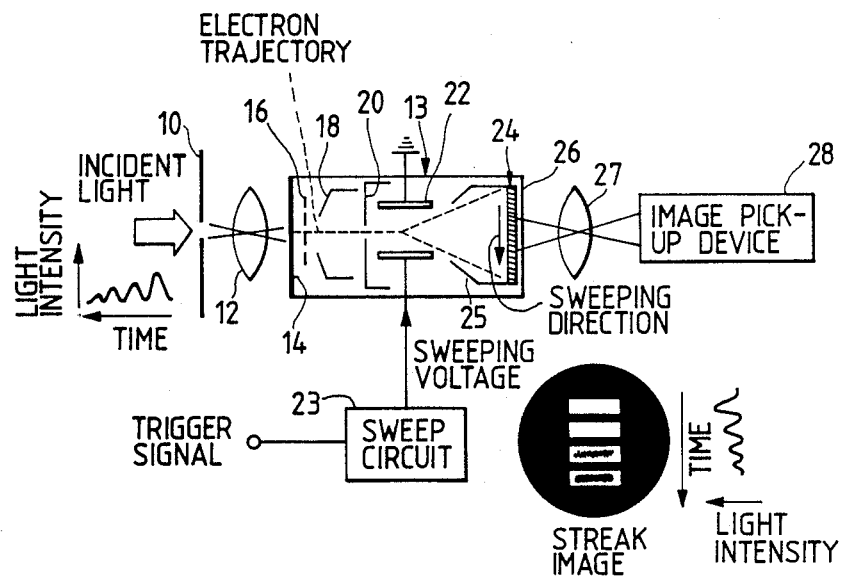
FIG. 17 is a sectional diagram of a streak camera.
Figure 18:
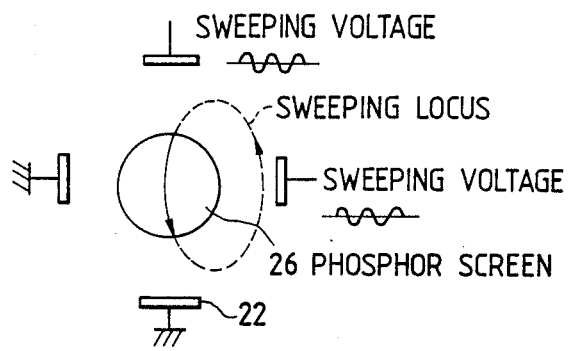
FIG. 18 is an explanatory diagram showing the locus of sweep by synchronous blanking.
Figure 19:
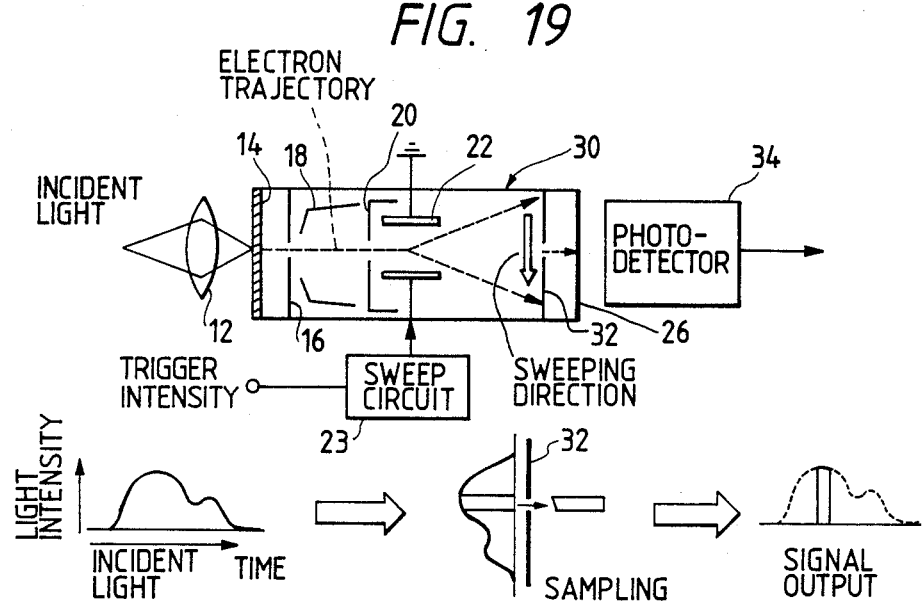
FIG. 19 is a sectional view of a sampling type optical oscilloscope.
Figure 20:
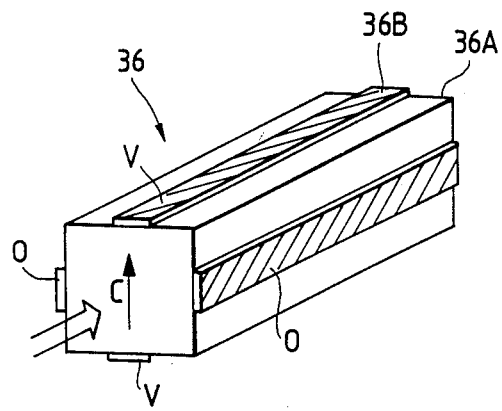
FIG. 20 is a perspective view showing an electro-optical deflector.
Figure 21:
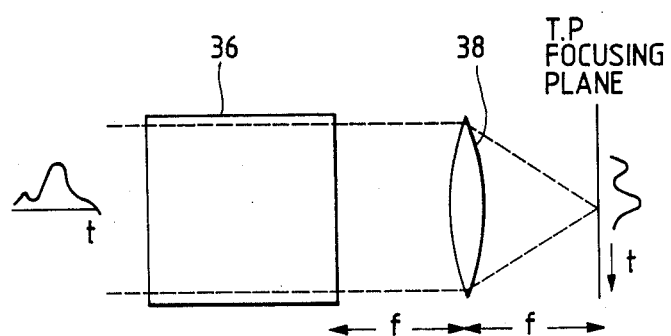
FIG. 21 is a diagrammatic illustration of an electro-optical streak camera.

In general, with respect to the streak camera illustrated in FIG. 17, when the sweep position is off of the phosphor screen 26 (or when it is in standby state, or at the end of the sweep), the photoelectrons in the streak tube 13 strike the focusing electrode 18, the deflecting electrodes 22, etc., and produce scattered electrons. Therefore, in accordance with the invention, use is made of an electron gate, such as a gate between the photocathode and the accelerating electrode for applying a negative pulse voltage to the photocathode 14, or a positive pulse voltage to the accelerating electrode 16. The electron gate blocks unwanted photoelectrons immediately when emitted from the photocathode 14, thereby preventing a fogging phenomenon resulting from the aforementioned scattered electrons. Further, in order to block the photoelectrons produced by the light beam applied to the focusing electrode 18 in the rear stage or the thermal electron noise caused in the micro-channel plate (MCP) 24, an MCP gate for driving the MCP 24 with a pulse voltage or a gate by sweeping (elliptic sweep for synchronous blanking) is employed.

The above-described methods prevent the following difficulty: If, in the measurement of a low intensity light beam which follows a high intensity light beam in the measurement of a high repetition pulse light beam, or in the measurement of the long lifetime of fluorescence, a light beam is incident during other than the effective sweep period of the streak camera (including the return period), a false signal resulting from the above-described scattered electrons or the incidence of the light beam during the return period is superposed on the signal component, thus resulting in an erroneous measurement.

However, in the case where the gain of the above-described optical amplifier 40 can be controlled with an electrical signal, the optical amplifier 40 may be used to avoid the erroneous measurement That is, if the amplifier's gain is set to zero, then the light beam can be readily gated off (cut). This method has the greatest efficiency, because the light signal under measurement is directly cut. Further, if, in an electro-optical synchro scan type streak camera, the optical amplifier 40 is driven in synchronism with the synchro-scan frequency (80 to 200 MHz), then false signals formed during the return sweep period can be eliminated. On the other hand, the conventional streak camera is low in responsiveness except when an elliptical sweep is carried out, and therefore it cannot perform the above-described blanking operation during the synchro-scan period. In particular, the conventional electro-optical streak camera using the electro-optical deflector 36 cannot perform the blanking of unwanted signals.

The optical amplifier 40 that is capable of producing an optical output by amplifying input light by a factor that is dependent on an external electrical signal is available in various types including: a non-resonant traveling-wave type optical amplifier (TWA) which has an anti-reflection film coated on both end faces of a semi-conductor laser to suppress reflection from those faces; a Fabry-Perot type optical amplifier (FPA) which uses a conventional semiconductor laser as an optical amplifier with it being biased below the threshold level for oscillation; an optical fiber Raman amplifier which utilizes Raman scattering induced in an optical fiber; an amplifier using a DFB laser; and an injection synchronous amplifier. Semiconductor amplifiers are advantageous because of their compactness and ease of control in operation.

Among semiconductor optical amplifiers, TWA and FPA are particularly advantageous. TWA has fast response to electrical signals and is capable of amplification of high speed optical signals. Because of the absence of resonator dependent selectivity for wavelength, TWA has a broad (ca. 50 nm) wavelength range for gain and assures consistency in gain in the face of variation in the temperature or of the amplifier or in the wavelength of incident light. TWA is also superior in terms of gain saturation and noise characteristic which are two important characteristics of an optical amplifier. On the other hand, FPA is easy to fabricate and allows a high gain to be attained in the neighborhood of a threshold value even with low current injection because it utilizes multiple reflections between both end faces to produces signal gain.

Figure 2:
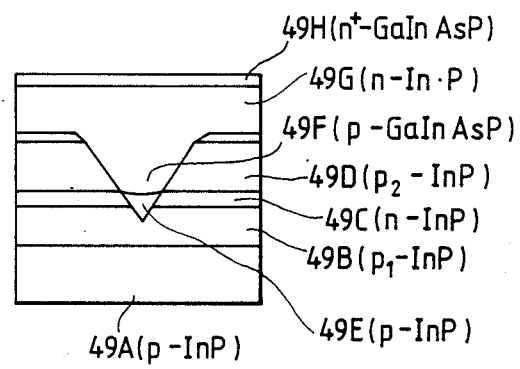
FIG. 2 is a sectional view showing one example of the structure of a semiconductor laser forming a traveling-wave type optical amplifier (TWA) that is an example of an optical amplifier employed in the invention.

Another advantage of the semiconductor optical amplifiers is that their gain can be easily adjusted by changing the amount of injection current, so they can also be used as an optical switch by turning on or off the injection of current as in the present invention A TWA that is suitable for use in the present amplifiers has an anti-reflection film coated on both end faces of a semiconductor laser 49 of the VIPS (V-grooved inner stripe of p-substrate) structure shown in FIG. 2 which may be formed by the following steps: in the first cycle of liquid-phase growth, a $p_1$-Inp buffer layer 49B, n-InP block layer 49C and $p_2$-InP block layer 49D are grown on a P-InP substrate 49A; thereafter a V-shaped groove having a (111)B face is formed in 49B, 49C and 49D by wet etching, with a $SiO_2$ stripe mask being prepared by a conventional photolithographic process; and in the second cycle of liquid-phase growth, a p-InP cladding layer 49E, a p-type or undoped GaInAsP active layer 49F, n-InP cladding layer 49H and N+-GaInAsP contact layer 49G are grown successively. The GaInAsP active layer 49F is formed at the bottom of the V-shaped groove, with its width and thickness being controlled to ca. 1.2 $\mu$m and 0.10 $\mu$m respectively. Thereafter, electrodes are formed and end faces are created by cleavage. An anti-reflection film is then deposited onto both end faces of the resulting semiconductor laser 49 using a material such as $SiO_2$ so as to fabricate a TWA. The semiconductor laser 49 of the VIPS structure has a sufficiently high efficiency of injection into the active layer to produce superior high output characteristics, so the TWA using this semiconductor laser also produces high gain and highly saturated output.

Figure 3:
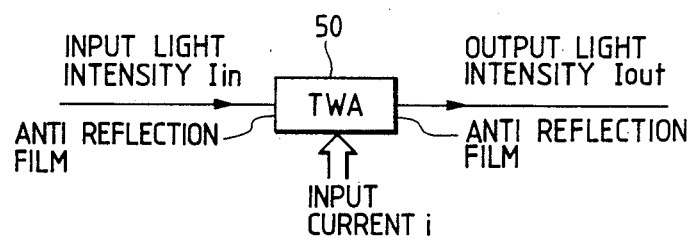
FIG. 3 is a block diagram for a description of the operating characteristic of the TWA.

The TWA 50 thus fabricated has a basic composition as shown in FIG. 3. When the intensity of input light $I_{in}$ being launched into the TWA 50 is constant, the intensity of output light $I_{out}$ from the TWA 50 will change nonlinearly as shown in FIG. 4 in response to the change in input current i. If the value of input current i to the TWA 50 is constant, $I_{out}$ will change also nonlinearly as shown in FIG. 5 in response to the change in $I_{in}$. It can therefore be seen that when $I_{in}$ is constant, $I_{out}$ can be controlled by i, whereas $I_{out}$ can be controlled by $I_{in}$ when current i is constant. Of course, the TWA can be employed as a linear amplifier by utilizing only a linear portion.

Figure 6:
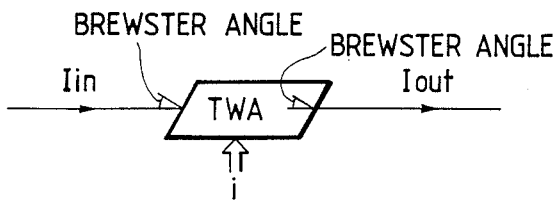
FIG. 6 is a block diagram showing one modification of the TWA.

In the TWA 50, reflection from both end faces is suppressed by the anti-reflection film coated thereon. It should, however, be noted that the anti reflection film is not the sole mechanism for suppressing reflection from both end faces of the semiconductor laser and the same results can be attained by cutting each of the end faces at an angle equal to the Brewster angle as shown in FIG. 6. In this case, the plane of polarization is restricted. However, this restriction may be an advantage in that any polarizer or analyzer is unnecessary when a need arises for restricting the plane of polarization.

Figure 7:
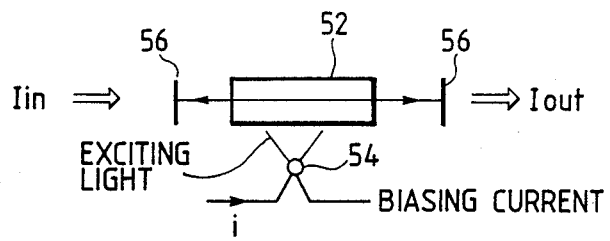
FIG. 7 through 10 are block diagrams showing other modifications of the TWA.
Figure 8:
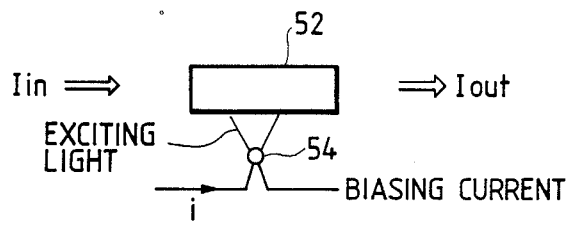

Besides the TWA 50 and FPA described above, other types of optical amplifiers can be used in the present invention, including the resonant optical amplifier shown in FIG. 7 which is biased to a level below the threshold for oscillation by imparting excitation light to a solid laser medium 52 with a laser diode 54, and the non-resonant optical amplifier shown in FIG. 8 that is similar to TWA in which reflection from both end faces of the solid laser medium 52 is suppressed by providing an anti-reflection film or adjusting the angle of each end face to be equal to the Brewster angle. In FIG. 7, the numeral 56 designates a resonant mirror. The laser diode 54 may or may not be supplied with a bias current for attaining a value in the neighborhood of the threshold level.

Figure 9:
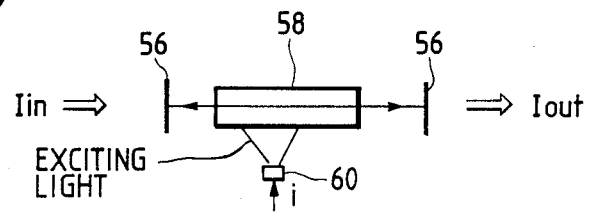

Another type of optical amplifier 40 that can be used in the present invention is shown in FIG. 9, in which a dye or gas laser medium 58 is excited with light from a light-emitting diode or a current control led lamp 60. Resonant mirrors 56 may be omitted from the system shown in FIG. 9.

Figure 10:
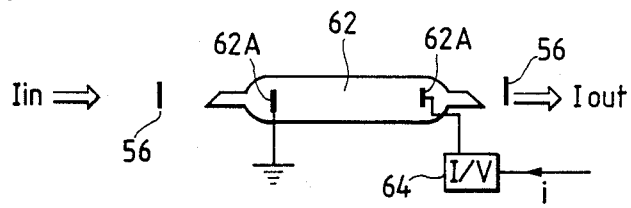

Still another type of optical amplifier that can be used in the present invention is shown in FIG. 10, in which a gas laser medium 62 is excited by discharge, or the voltage applied between electrodes 62A from a current to voltage converter 64. Resonant mirrors 56 may be omitted from the system shown in FIG. 10.

When at least one of an optical signal inputted to the optical amplifier 40 and a trigger signal for actuating the photodetector 42 can be delayed, both signals can be matched with each other in timing or a desired timing can be set between both signals.

The above-described optical detector 42 may be combined with a light sampling plate disposed on the focusing plane, that is, may be an electro-optical sampling type optical oscilloscope. The optical detector is further combined with a light chopping element for turning on and off a light signal under measurement at a predetermined frequency, and with a lock-in amplifier that takes only the frequency component out of the output of the optical detector 42, then lock-in detection is performed. As a result, in addition to the above-described effects, an increased S/N is obtained The above-described light chopping element may be provided as: an ordinary light chopper, the above-described optical amplifier, a light modulator using an electro-optical effect, an E-O modulator, an optical Kerr shutter, a liquid crystal shutter or the like. When the light chopping element is the optical amplifier whose gain can be controlled with an electrical signal, then the amplification factor can be increased.

In the case where the above-described optical amplifier 40 is so designed as to operate as the light chopping element, it is unnecessary to provide another light chopping element. As a result, the arrangement of the streak camera is simplified.

Optical fibers may be employed in the input section of a light beam under measurement and/or in the coupling section between the optical amplifier 40 and the electro-optical deflector 36. In such a case, adjustment of the optical system is unnecessary and, with the components having a resulting high degree of freedom, the streak camera can be miniaturized.

The optical amplifier 40 and the electro-optical deflector 36 may be joined into one unit. In this case, the streak camera can be further miniaturized and improved in vibration resistance. As a result, it may be suitable for loading into an artificial satellite or rocket.

Various alternate embodiments of the electro-optical streak camera of the present invention as illustrated in FIG. 1 and described above are presented next.

A first embodiment of the invention is obtained by modifying an electro-optical streak camera, having the optical amplifier 40 and electro-optical deflector 36, such as shown in FIG. 1. In the first embodiment, as shown in FIG. 11, the optical amplifier 40 is replaced with the above-described TWA 50, and the input plane 70A of an image sensor (photodetector) 70 such as a linear array image sensor is placed at the output focusing plane (Fourier plane). The output of the image sensor 70 is applied through a control circuit 72 to a display unit 74.

A beam splitter 76 is provided on the input side of the camera to split a light signal to be measured into two parts. The first part of the light signal passes through the beam splitter 76, while the second part is reflected by the splitter. The second part of the input light signal is applied to a second photodetector 78, which applies a trigger signal to a sweep circuit 80 to generate a sweep voltage. The gain of the TWA 50 is externally controlled through an amplifier 84 connected to a connector 82 for gain control signal input.

The TWA 50, the electro optical deflector 36, the output lens 38, the input plane 70A of the image sensor 70, the amplifier 84, and the sweep circuit 80 are enclosed in an electrically conductive light shielding metal casing 86. The light signal passed through the beam splitter 76 is applied to the TWA 50 through an opening 86A formed in the metal casing 86.

The metal casing 86 may have another opening so that the second photodetector 78 can be disposed inside it. Alternatively, only one opening may be formed in the metal casing 86 so that the beam splitter 76 and the second photodetector 78 are arranged immediately behind the opening and positioned inside the metal casing 86.

The operation of the first embodiment is described next.

A light signal under measurement is applied through the beam splitter 76 and the opening 86A in the metal casing 86 to the TWA 50. The light signal, being amplified with a gain that is set by the gain control signal through the connector 82, is applied to the electro-optical deflector 36, where it is deflected by the output sweep voltage of the sweep circuit 80. The output sweep voltage of the sweep circuit 80 starts the sweeping operation in response to the trigger signal which the second photodetector 78 produces upon detection of the second part of the light signal that has been reflected from the beam splitter 76. Thus, the sweep voltage is synchronous with the light signal under measurement.

The light signal deflected by the electro-optical deflector 36 is focused by the output lens 38 on the input plane 70A of the image sensor 70. The output of the image sensor 70 is converted by the control circuit 72 into a signal suitable for display. As a result, an image corresponding to a streak image or the variation in intensity of the light signal under measurement is displayed on the display unit 74.

In the above-described first embodiment, the sweep voltage is generated in response to the second part of the light signal which is provided by the beam splitter. Therefore, the streak camera operates such that the light signal under measurement is accurately synchronous with the sweep voltage.

Further, in accordance with the first embodiment, the TWA 50, the electro-optical deflector 36, the output lens 38, the input plane 70A of the image sensor 70, the amplifier 84 and the sweep circuit 80 are all positioned inside the light-shielding electrically conductive metal casing 86. Therefore, the streak camera is substantially unaffected by external noises or unwanted light signals. The same effect can also be obtained when the beam splitter 76 and the second photodetector 78 are installed inside the metal casing 86.

Figure 12:
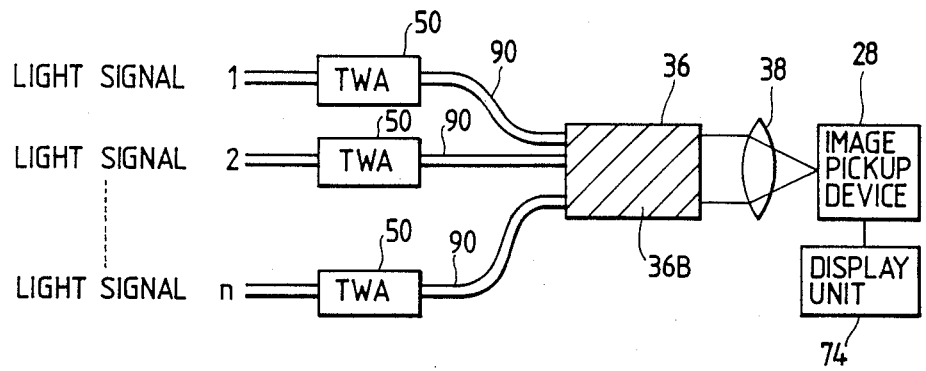
FIG. 12 is a block diagram showing a second embodiment of the electro-optical streak camera according to the invention.

A second embodiment of the invention is described next with reference to FIG. 12.

In accordance with the second embodiment of the invention, a plurality of the above-described TWAs 50 are provided in an electro-optical streak camera similar to that shown in FIG. 11 (the first embodiment). The output light signals of the TWAs 50 are applied through optical fibers 90 to the electro-optical deflector 36. The fibers 90 are arranged in a line perpendicular to the direction of sweep of the deflector 36. The resultant streak image is detected with an image pickup device 28 such as a television camera, SIT camera, CCD camera or the like.

In accordance with the second embodiment, light signals 1 through n under measurement are applied in such a manner that they are aligned perpendicular to the direction of deflection of the electro-optical deflector 36, and therefore a plurality of light signals can be observed in a parallel mode.

Further if the different light beams under measurement are incident on deflector 36 at different times from one another, this being accomplished, for example, by making the optical fibers of the TWAs 50 different in length from one another, then the waveforms of the light signals can be observed one after another. When the one light signal is split and applied to the TWAs in the above-mentioned system, the signal can be observed as a parallel image consisting of divided parts of a long streak image. Additionally,, the streak camera can be modified as follows. Light signals under measurement can be initially sorted out with a spectroscope according to wavelength, and then amplified by the TWAs 50 and provided separately according to the wave-length.

A third embodiment of the invention is described next with reference to FIG. 13.

In accordance with the third embodiment, in an electro-optical streak camera similar to that which is shown in FIG. 11 (the first embodiment), a light signal to be measured is applied through an optical fiber 92 to a TWA 50. A fiber branching unit 94 is interposed in the optical fiber 92 to apply part of the light signal through an optical fiber 96 to a second photodetector 78. The photodetector 78 is connected to a sweep circuit 80 through both a variable delay circuit 98, for varying the amount of delay of a self-trigger signal, and a change-over switch 102 for selecting a self-trigger signal, and a change-over switch 102 for selecting a self-trigger based on the output of the variable delay circuit 98 or an external trigger based on an external trigger signal externally applied through a connector 100 to the streak camera.

The branching unit 94 and the second photodetector 78 are installed inside a metal casing 86. The light signal under measurement is applied through an optical connector 91 to the optical fiber 92.

In accordance with the third embodiment, the optical fibers are employed as part of the optical path. As a result, in the streak camera, it is unnecessary to effect fine adjustment to the optical system. Further, the components can be arranged with a high degree of freedom, so that, for example, the streak camera can be miniaturized.

Further, in accordance with the third embodiment, the variable delay circuit 98 is provided to change the time delay of the self-trigger signal as required, and therefore the sweep can be started at any time. As was described above, the input light signal is applied through the optical fiber 92 to the TWA 50. Therefore, if the optical fiber 92 has sufficient length to allow an electrical signal (or self trigger signal), which is lower in velocity than an optical signal, to reach the electro-optical deflector 36 before the optical signal, then the waveform of the light beam under measurement can be positively observed before it changes.

In the case where the application of an optical signal to the electro-optical deflector 36 and the sweeping operation are synchronous with each other, and it is unnecessary to vary the amount of delay of the self-trigger signal, the variable delay circuit 98 may be replaced with a delay circuit providing a constant amount of delay.

A fourth embodiment of the invention is described next with reference to FIG. 14.

Figure 13:
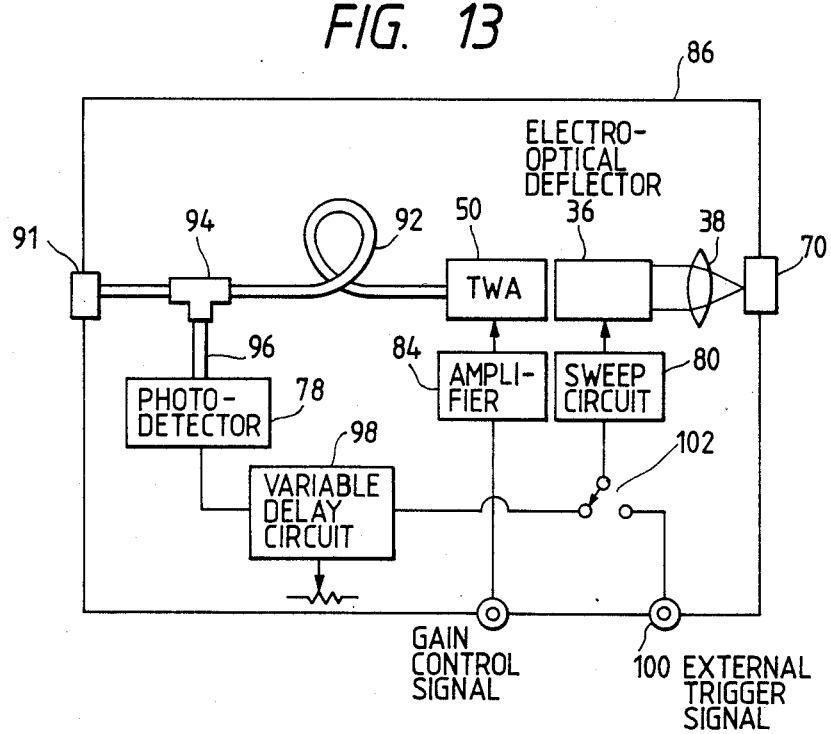
FIG. 13 is a block diagram showing a third embodiment of the electro-optical streak camera according to the invention.

In accordance with the fourth embodiment, in an electro-optical streak camera similar to that shown in FIG. 13 (the third embodiment), a slit plate 104 for spatially limiting a streak image is disposed in the focusing plane of an output lens 38. The streak image passed through the slit plate 104 is detected with a photomultiplier 106 or a point detector such as an avalanche photodiode or other suitable type of photodiode. An automatic delay circuit 107 is provided to automatically change the time of delay. Further, a change-over switch 109 is provided between the second photodetector 78 and the automatic delay circuit 107 to select the output of the second photodetector 78 or an external trigger signal externally applied to the streak camera. The input light signal under measurement is displayed on a display unit 110 such as an X-Y recorder with the X-axis for the delay time of the automatic delay circuit and with the Y-axis for the sampling output amplified by an amplifier 108. Thus, the fourth embodiment may be characterized as a sampling type electro-optical streak camera.

Figure 15:
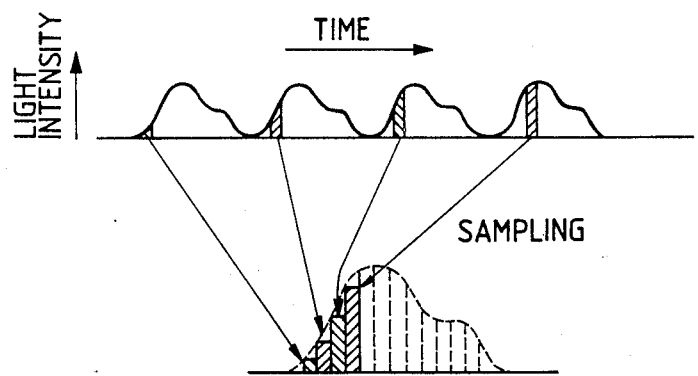
FIG. 15 is an explanatory diagram of the operation of the fourth embodiment of the streak camera shown in FIG. 14.

In the fourth embodiment, a light signal applied through the optical connector 91 is sampled with the amount of delay being changed gradually by the automatic delay circuit 107 in synchronism with the output of the second photodetector 78 or the external trigger signal. As a result, the reconstructed waveform of the light signal is displayed on the display unit 110 as shown in FIG. 15.

Therefore, using a camera constructed in accordance with the fourth embodiment, a repetitive waveform can be measured or analyzed with high accuracy.

Figure 16:
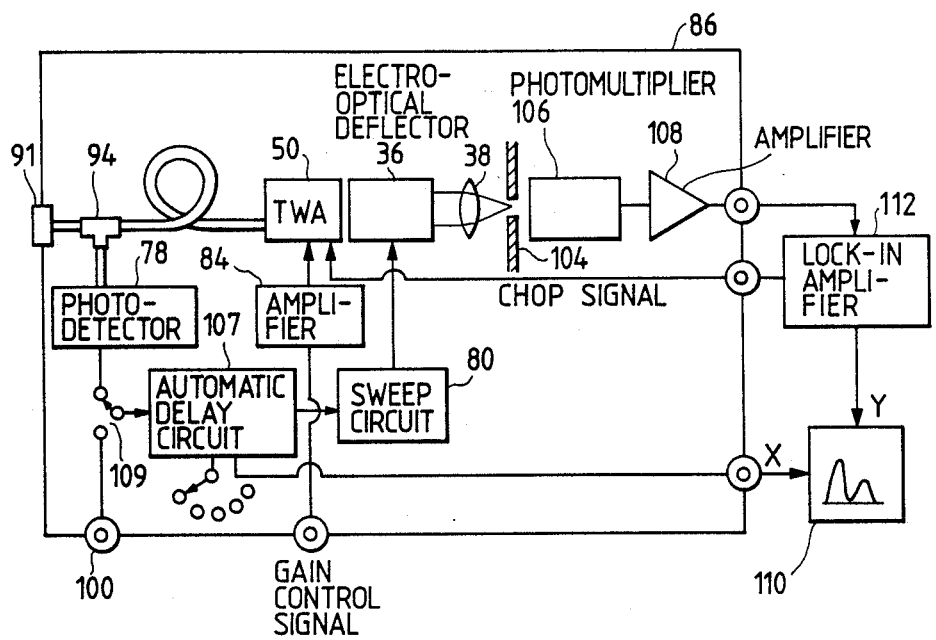
FIG. 16 is a block diagram showing a fifth embodiment of the electro-optical streak camera according to the invention.

A fifth embodiment of the invention is described next with reference to FIG. 16.

Figure 14:
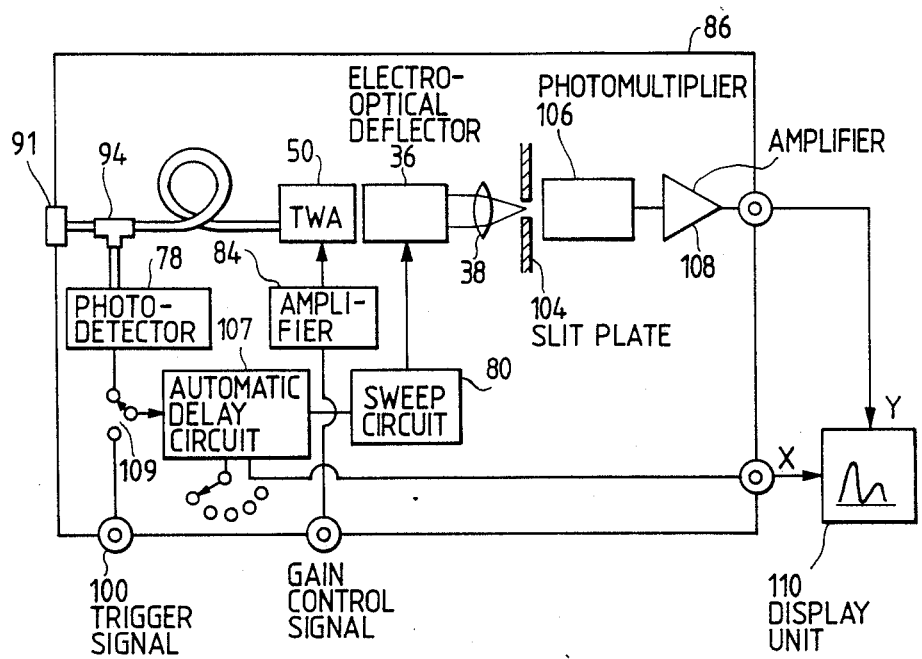
FIG. 14 is a block diagram showing a fourth embodiment of the electro-optical streak camera according to the invention.

In accordance with the fifth embodiment, in a sampling type electro-optical streak camera similar to that which is shown in FIG. 14 (the fourth embodiment), a lock-in amplifier 112 having a narrow band width is provided to detect only a predetermined frequency component (lock-in frequency) of the output signal of amplifier 108. Further, the gain of TWA 50 is turned on and off with the lock-in frequency of the lock-in amplifier 112.

The use of lock-in detection, in accordance with the fifth embodiment, enables the S/N ratio to be increased. Further, in accordance with the fifth embodiment, the TWA 50 is used as a light chopping element for lock-in detection. Therefore, the streak camera is simple in construction. In addition to the TWA 50, another TWA may be provided as a light chopping element for lock-in detection. That is, two TWAs may be arranged in tandem. In this case, the amplification factor is increased.

Further, a pulse generator may be provided for the streak camera so that, instead of the self lock-in system, an external lock-in system is employed.

Thus, it is intended that the present invention cover the modifications and variations of this invention provided they come within the scope of the appended claims and their equivalents.

What is claimed is:

1. An electro-optical streak camera for measuring a light signal comprising:
    an optical amplifier for amplifying the light signal under measurement to provide an amplified light signal;
    an electro-optical deflector for deflecting the amplified light signal; and
    means for detecting the deflected light signal.

2. The electro-optical streak camera of claim 1, wherein said optical amplifier is a non-resonance type traveling-wave optical amplifier; and
    said non-resonance type amplifier is provided as a semiconductor laser having an anti-reflection film on ends thereof to suppress optical reflections.

3. The electro-optical streak camera of claim 2, wherein said optical amplifier is coupled to receive an externally generated electrical signal for controlling a gain of said optical amplifier.

4. The electro-optical streak camera of claim 1, wherein said optical amplifier is coupled to receive an externally generated electrical signal for controlling a gain of said optical amplifier.

5. The electro-optical streak camera of claim 3 or 4, wherein the gain of said optical amplifier can be controlled to operate said optical amplifier as an optical gate.

6. The electro-optical streak camera of claim 1, wherein said optical amplifier is a Fabry Perot type optical amplifier.

7. The electro-optical streak camera of claim 1, wherein said optical amplifier comprises a DFB laser.

8. The electro optical streak camera of claim 1, wherein said optical amplifier comprises an injection synchronization type amplifier.

9. The electro-optical streak camera of claim 1, wherein said optical amplifier comprises a resonance type optical amplifier; and
    said resonance type amplifier includes a solid laser medium and a laser diode for applying an exciting light to said solid laser medium.

10. The electro-optical streak camera of claim 1, wherein said optical amplifier comprises a dye laser medium; and
    light emitting means for applying an exciting light to said dye laser medium.

11. The electro-optical streak camera of claim 1, wherein said optical amplifier comprises a gas laser medium.

12. The electro-optical streak camera of claim 1, including means for delaying application of the light signal under measurement to said optical amplifier.

13. The electro-optical streak camera of claim 1, wherein said electro-optical deflector is responsive to a trigger signal to deflect the amplified light signal; and
    said streak camera further including means for controllably delaying application of the trigger signal to said electro-optical deflector.

14. The electro-optical streak camera of claim 1 further including:
    means for splitting the light signal under measurement into a first and a second light signal part, said first signal part being applied to said optical amplifier;
    means, responsive to the second signal part, for generating a deflection trigger signal; and
    sweep voltage generating means, responsive to the trigger signal, for generating a sweep voltage for application to said electro-optical deflector.

15. The electro-optical streak camera of claim 14, wherein said detecting means comprises an image sensor.

16. The electro-optical streak camera of claim 1, comprising at least two optical amplifiers;
    an optical fiber associated with each of said optical amplifiers for receiving on an input end the amplified light signal; and
    output ends of said optical fibers being applied to said electro-optical deflector and arranged in a line perpendicular to a sweep direction of said electro-optical deflector.

17. The electro-optical streak camera of claim 1, further including an optical fiber, said light signal under measurement being transmitted to said optical amplifier through said optical fiber;
    a photodetector;
    a branching unit interposed in said optical fiber to apply a part of said light signal under measurement to said photodetector, said photodetector generating a trigger single in response to application thereto of part of said light signal under measurement;
    sweep voltage generating means, responsive to the trigger signal, for generating a sweep voltage for application to said electro-optical deflector; and
    means, coupled between said photodetector and said sweep voltage generating means, for delaying said trigger signal.

18. The electro-optical streak camera of claim 17, further including a slit board, said electro-optical deflector deflecting the amplified light signal over a surface of said slit board having a slit; and
    said detecting means detecting a portion of the amplified light signal passing through said slit in said slit board.

19. The electro-optical streak camera of claim 1, further including a slit board for limiting a portion of the amplified light signal that is detected.

20. The electro-optical streak camera of claim 19, further including:
    means for turning on and off said light signal under measurement at a predetermined frequency; and
    a lock-in amplifier having a narrow band width for detecting a lock-in frequency component from an output of said detecting means.

21. The electro-optical streak camera of claim 1, wherein said detecting means, said optical amplifier and said detecting means are positioned within an electrically conductive casing.

22. The electro-optical streak camera of claim 1, said detecting means including an image sensor positioned in an image forming plane of said streak camera; and
    a display unit coupled to receive an output of said image sensor.

* * * * *

UNITED STATES PATENT AND TRADEMARK OFFICE
CERTIFICATE OF CORRECTION

PATENT NO.  : 4,958,231
DATED       : September 18, 1990
INVENTOR(S) : Yutaka Tsuchiya It is certified that error appears in the above-identified patent and that said Letters Patent is hereby corrected as shown below:

Title Page:
In the Abstract, Line 4, change "photodector" to --photodetector--;

Column 6, Line 22, change "49H" to --49G--;

Column 6, Line 23, change "49G" to --49H--;

Claim 8, Column 11, Line 41, change "electro optical" to --electro-optical--;

Claim 17, Column 12, Line 32, change "single" to --signal--.

Signed and Sealed this

Seventeenth Day of November, 1992

*Attest:*

DOUGLAS B. COMER

*Attesting Officer*       *Acting Commissioner of Patents and Trademarks*